Dec. 15, 1931.　　　　H. H. TALBOT　　　　1,836,690
TRANSFER APPARATUS FOR STRIP MATERIAL
Filed Dec. 20, 1928　　2 Sheets-Sheet 1
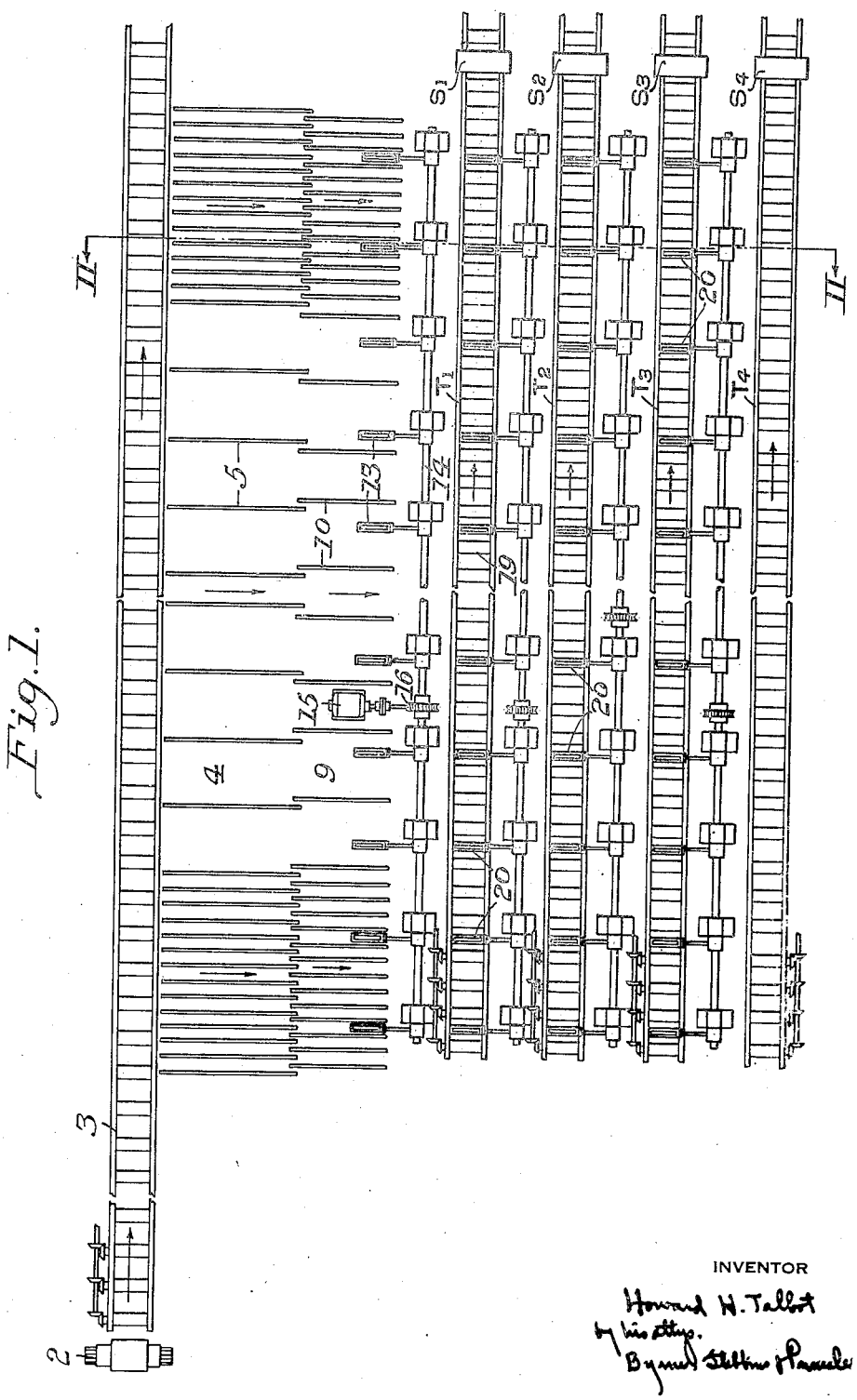
INVENTOR
Howard H. Talbot
by his atty.

Dec. 15, 1931.  H. H. TALBOT  1,836,690
TRANSFER APPARATUS FOR STRIP MATERIAL
Filed Dec. 20, 1928   2 Sheets-Sheet 2
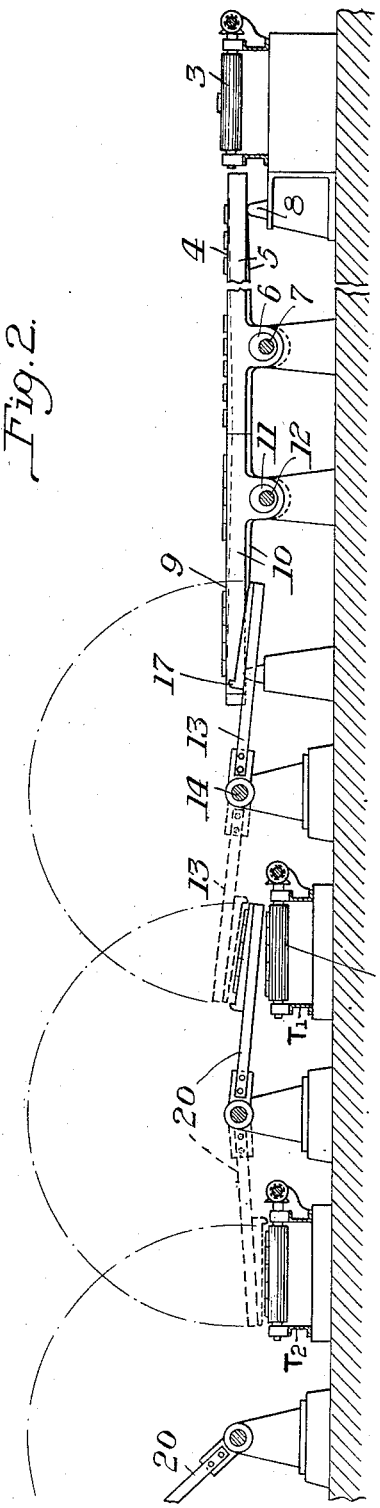
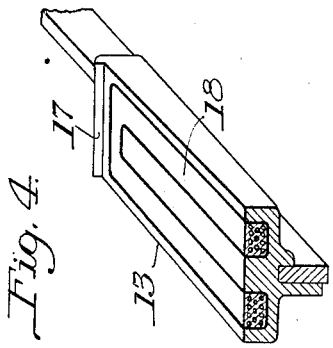
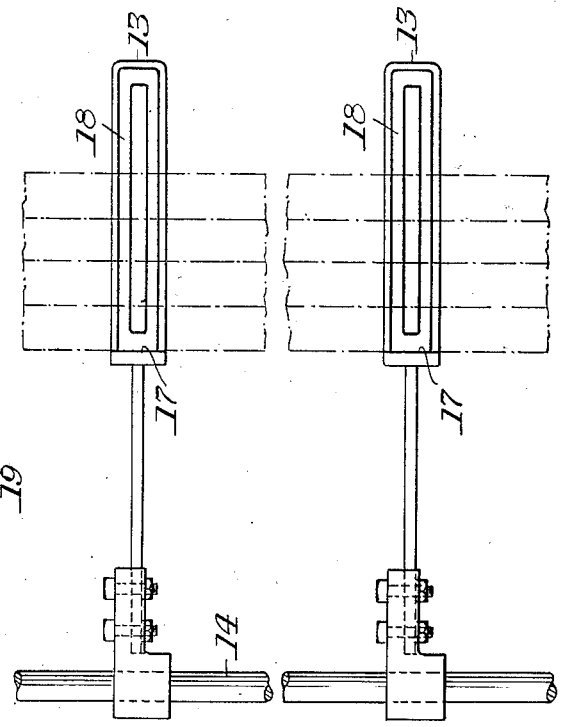
INVENTOR
Howard H. Talbot Patented Dec. 15, 1931

1,836,690

UNITED STATES PATENT OFFICE

HOWARD H. TALBOT, OF PITTSBURGH, PENNSYLVANIA, ASSIGNOR TO UNITED ENGINEERING & FOUNDRY COMPANY, OF PITTSBURGH, PENNSYLVANIA, A CORPORATION OF PENNSYLVANIA

TRANSFER APPARATUS FOR STRIP MATERIAL

Application filed December 20, 1928. Serial No. 327,430.

This invention relates to transfer apparatus for strip material, and is particularly useful in connection with a rolling mill for transferring rolled strips from the cooling bed to any one of a plurality of shear tables.

The material is delivered from a strip mill at a very high speed, usually about 2400 feet per minute. Each strip may be up to 200 feet long and the rate of production of the rolling mill is so great that a number of shears are necessary to handle the product. For economy of space, it is desirable to have the tables for the several shears arranged in general parallelism alongside the cooling bed. I provide a transfer mechanism which is particularly useful with such an arrangement, although it has other applications.

I preferably employ a transfer device in connection with each receiving station (shear table), such transfer device being movable to a discharge position over its station from a receiving position over the adjacent station. The station closest to the cooling bed also has a transfer device, whereby material may be delivered from the cooling bed either to the first station or to the transfer device for the second station. The transfer device for the second station may deliver material to such station or may, in turn, deliver it to a transfer device for the third station. In this manner any number of stations may be supplied with material.

The transfer devices preferably comprise arms movable from a position over one station to a position over the other station. Such arms may be mounted on a shaft running parallel to the stations and lying therebetween, so that they describe a semi-circular path during the transfer step. Means is provided for retaining the material on the arms during the transfer. Magnets are preferably employed for this purpose.

The arms are preferably so arranged that when they are in material receiving position they lie above the plane of material at the station which the arms overlie. This insures that the shear associated with such station may operate continuously despite the fact that material is transferred over the shear table.

The first transfer device is preferably supplied with material from the cooling bed through a collecting device. In the ordinary operation of the cooling bed the strips are spaced some distance apart, and in order to handle as much material as possible, it is desirable that the material be collected before it is supplied to the first transfer device.

In the accompanying drawings illustrating the present preferred embodiment of the invention, Figure 1 is a plan view, largely diagrammatic, illustrating a rolling mill, a cooling bed, shear tables and the transfer devices;

Figure 2 is a transverse section taken on the line II—II of Figure 1;

Figure 3 is a view to enlarged scale of a pair of transfer arms, and

Figure 4 is a perspective view of a portion of one of the arms showing the material retaining magnet.

Figure 1 shows the last stand 2 of a strip mill from which strips are delivered to a runout table 3 and thence to a cooling bed 4. The cooling bed is illustrated as being of the shuffle bar type wherein bars 5 are moved in an orbital path by eccentrics 6 on a shaft 7. The eccentrics 6 are placed near one end of the bars, the other ends being supported on a block 8. The eccentrics for successive arms are out of time with one another so that the arms are divided into two sets which are alternately raised upwardly, then outwardly, downwardly and inwardly.

In Figure 1 the bars 5 are shown spaced relatively wide apart in the middle portion of the cooling bed and relatively close together at the ends. This insures that the ends of the strips will not droop.

The cooling bed 4 delivers the material to a collector indicated generally by the reference character 9. The collector is substantially the same as the cooling bed, consisting of shuffle bars 10 operated by eccentrics 11 on a shaft 12. However, the shuffle bars of the collector are capable of being run at a higher speed so that the material may be quickly moved across the collector to a position where it may be picked up by the first transfer device.

The transfer device which is supplied by the collector 10 comprises spaced arms 13 on a shaft 14. The shaft is rotatable in either direction by a reversing motor 15 connected to the shaft through worm gearing 16. When the arms are in the receiving position shown in solid lines in Figures 2, they lie between the shuffle bars of the collector 10. The arms are provided with stops 17 which limit the movement of the strip material across the collector 10. When the collector is run at high speed, all the material thereon is rapidly moved over until the strips lie in close proximity and against the stop 17. The shaft 14 is then rotated counter-clockwise, as viewed in Fig. 2, to bring the arms 13 to the dotted line position. In order to prevent the material from falling off, each arm is provided with a magnet coil 18, and these coils are energized during the transfer.

A shear table $T_1$, feeding a shear $S_1$, lies below the dotted line position of the arms 13. The material may thus be discharged by the arms to the table $T_1$ by deenergizing the magnets 18. Certain of the rolls 19 of the table $T_1$ may contain magnet coils which may be energized to overcome any residual magnetism in the coils 18.

Figure 1 also shows shear tables $T_2$, $T_3$ and $T_4$ for shears $S_2$, $S_3$ and $S_4$, arranged alongside the shear table $T_1$ and shear $S_1$. Arms 20, corresponding to the arms 13 and similarly supported and driven, are placed between each pair of shear tables. As shown in Figure 2, the arms which lie between the shear tables $T_1$ and $T_2$ have a receiving position immediately over the shear table $T_1$. In such position the arms may receive material from the arms 13. Moreover, since in their receiving position they are spaced a short distance above the material on the shear table $T_1$, the transfer from the arms 13 to the arms 20 may be effected without disturbing in any way the operation of the shear $S_1$. The arms 20, which lie between the tables $T_1$ and $T_2$ are thus effective for transferring material from the arms 13 to the table $T_2$. Similarly the arms lying between the tables $T_2$ and $T_3$ are effective for receiving material from those arms which lie between the tables $T_1$ and $T_2$ for transferring the same to the table $T_3$ or, in turn, transferring it to arms which carry it to the table $T_4$.

It will be understood that each shear table may have energized rollers for overcoming the residual magnetism in the transfer arms. In those cases where the material is delivered from one set of transfer arms to the next set, the residual magnetism is overcome by energizing the magnets in the receiving arms.

During the time that the arms 13 are out of their position below the shuffle bars of the collector 10, the collector is idle or is run at very low speed so that no material is fed a sufficient distance across the arms of the collector to interfere with the return movement of the arms 13.

I have illustrated and described a present preferred embodiment of the invention. It will be understood, however, that it is not limited to the form shown but may be otherwise embodied within the scope of the following claims.

I claim:

1. Material handling means comprising a conveyor, magnetic transfer arms on each side thereof rotatable into a position overlying said conveyor, means for placing magnetic articles on some of said arms, and means for rotating said last mentioned arms to a position for depositing said articles on said conveyor or on others of said arms.

2. Material handling means comprising a conveyor, magnetic transfer arms on each side thereof rotatable into a position overlying said conveyor, means for placing magnetic articles on some of said arms, means for rotating said last-mentioned arms to a position for depositing said articles on said conveyor or on others of said arms, and means for disengaging said articles from said transfer arms.

3. In a mill, a delivery mechanism, a cooling table arranged to receive material from said delivery mechanism and to transfer it laterally, a collecting table arranged to receive said material from said cooling table and to transfer it laterally thereover at a higher speed in order to rapidly collect it together, a plurality of conveyors, transfer apparatus comprising a plurality of rotatable transfer arms disposed on each side of said conveyors and arranged to receive material on their upper faces and swing it over to an inverted position above the next conveyor or above other of said arms, and means for retaining said material in engagement with said arms during their rotation.

4. The combination with a plurality of parallel conveyors, of means for transferring elongate articles broadside of said conveyors to any one of them, said means comprising series of transfer arms between the conveyors rotatable to positions above them, means for placing elongate articles on the outer ends of one of said series of arms at one side of one of the conveyors, and means for independently rotating said series of arms on both sides of said last-named conveyor to deposit said material either on said conveyor or on the outer ends of the series of arms at the other side thereof while positioned above and clear of it.

In testimony whereof I have hereunto set my hand.

HOWARD H. TALBOT.